United States Patent
Karr

(10) Patent No.: US 8,862,273 B2
(45) Date of Patent: Oct. 14, 2014

(54) ACOUSTIC NOISE MANAGEMENT THROUGH CONTROL OF ELECTRICAL DEVICE OPERATIONS

(75) Inventor: Lawrence J. Karr, Santa Monica, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/056,026

(22) PCT Filed: Jul. 29, 2010

(86) PCT No.: PCT/US2010/043629
§ 371 (c)(1),
(2), (4) Date: Jan. 26, 2011

(87) PCT Pub. No.: WO2012/015404
PCT Pub. Date: Feb. 2, 2012

(65) Prior Publication Data
US 2013/0166076 A1     Jun. 27, 2013

(51) Int. Cl.
| | |
|---|---|
| G10K 11/16 | (2006.01) |
| G05B 13/04 | (2006.01) |
| G05B 15/02 | (2006.01) |
| G05D 19/02 | (2006.01) |

(52) U.S. Cl.
CPC ............... *G05D 19/02* (2013.01); *G05B 15/02* (2013.01); *G10K 2210/30351* (2013.01); *G05B 2219/2642* (2013.01); *G10K 2210/12* (2013.01); *G10K 2210/3055* (2013.01)
USPC ........................................ 700/280; 381/71.1

(58) Field of Classification Search
CPC ........... G05B 15/02; G05B 2219/2642; G05D 19/02; G10K 11/1786; G10K 2210/105; G10K 2210/12; G10K 2210/121; G10K 2210/3035–2210/30351

USPC ............. 700/28–33, 275, 280; 381/71.1–73.1
See application file for complete search history.

(56) References Cited

U.S. PATENT DOCUMENTS

| | | |
|---|---|---|
| 5,129,003 A | 7/1992 | Saruta |
| 5,412,590 A | 5/1995 | Gaudette et al. |
| 5,938,757 A | 8/1999 | Bertsch |

(Continued)

FOREIGN PATENT DOCUMENTS

CN            101354885 A      1/2009

OTHER PUBLICATIONS

International Search Report and Written Opinion for International Application No. PCT/US2010/043629 mailed on Dec. 17, 2010.

(Continued)

*Primary Examiner* — M. N. Von Buhr
(74) *Attorney, Agent, or Firm* — Turk IP Law, LLC

(57) ABSTRACT

Technologies are generally described for automatically managing noise profile in a predefined area by determining a desired noise profile within the predefined area, monitoring noise levels and/or frequencies within the predefined area, and adjusting operational aspects of one or more noise emitting devices in order to achieve the desired noise profile within the predefined area. A noise management system according to embodiments may be centrally controlled or organized in a distributed manner with control modules on individual noise emitting devices interacting through wired or wireless media. Furthermore, the adjustment of the operations of the noise emitting devices in order to achieve the desired noise profile may be accomplished through computing an acoustic transfer function or measuring actual noise levels/frequencies.

30 Claims, 8 Drawing Sheets

(56) References Cited

U.S. PATENT DOCUMENTS

| | | | |
|---|---|---|---|
| 5,986,406 A | 11/1999 | Hwang et al. | |
| 6,414,840 B2 | 7/2002 | Suzuki | |
| 6,512,831 B1 | 1/2003 | Herreman et al. | |
| 6,578,106 B1* | 6/2003 | Price | 711/111 |
| 6,591,198 B1* | 7/2003 | Pratt | 702/35 |
| 6,624,536 B1 | 9/2003 | Sawada et al. | |
| 6,654,467 B1 | 11/2003 | York et al. | |
| 6,778,964 B2 | 8/2004 | Geiger et al. | |
| 6,836,849 B2* | 12/2004 | Brock et al. | 713/310 |
| 7,136,709 B2* | 11/2006 | Arling et al. | 700/65 |
| 7,333,618 B2 | 2/2008 | Shuttleworth et al. | |
| 7,379,778 B2* | 5/2008 | Hayes et al. | 700/66 |
| 7,478,486 B2 | 1/2009 | Wunderlin et al. | |
| 8,239,860 B2* | 8/2012 | Locker et al. | 718/1 |
| 8,295,504 B2* | 10/2012 | Ady et al. | 381/73.1 |
| 8,331,577 B2* | 12/2012 | Lyon et al. | 381/71.5 |
| 8,426,994 B2* | 4/2013 | Nielsen et al. | 290/44 |
| 2004/0120113 A1* | 6/2004 | Rapaich | 361/687 |
| 2004/0243405 A1* | 12/2004 | Casparian et al. | 704/226 |
| 2007/0241928 A1 | 10/2007 | Hardwick et al. | |
| 2009/0092261 A1* | 4/2009 | Bard | 381/71.1 |
| 2009/0092262 A1 | 4/2009 | Costa et al. | |
| 2010/0141469 A1 | 6/2010 | Son et al. | |

OTHER PUBLICATIONS

"Automate your home with Indigo", Macintosh Home Automation and Control Server, 4 pages, http://www.perceptiveautomation.com/indigo/ index.html, (2010).

Capone et al., A New Architecture for Reduction of Energy Consumption of Home Appliances, European conference of the Czech Presidency of the Council of the EU Towards eENVIRONMENT Opportunities of SEIS and SISE: Integrating Environmental Knowledge in Europe, Masaryk University, 2009; http:/www.e-envi2009.org/proceedings/.

Mitsubishi Electric Develops Single-Chip Power Line Communication IC for Cost-Effective Smart Home Networking, http://www.thefreelibrary.com/Mitsubishi+Electric+Develops+SingleChip+Power+Line+Communication+IC+111-a092632024, (2002).

Potamitis et al., an Integrated System for Smart-Home Control of Appliances Based on Remote Speech Interaction, Wire Communications Laboratory, Electrical and Computer Engineering Dept., University of Patras, 261 10 Rion, Patras, Greece, Tel:+30 2610 991722, Fax:+30 2610 991855; e-mail: potamitis@wcl.ee.upatras.gr.

Soo-young Suk et al., Voice Activated Appliances for Severely Disabled Persons, Advanced Industrial Science and Technology, Japan, (2008).

* cited by examiner

COMPUTER PROGRAM PRODUCT 800

SIGNAL-BEARING MEDIUM 802

804 AT LEAST ONE OF

ONE OR MORE INSTRUCTIONS FOR DETERMINING DESIRED NOISE PROFILE WITHIN A PREDEFINED AREA;
    ONE OR MORE INSTRUCTIONS FOR DETECTING NOISE PROFILE(S) WITHIN A PREDEFINED AREA; OR
    ONE OR MORE INSTRUCTIONS FOR ADJUSTING THE OPERATION OF NOISE EMITTING SOURCES TO ACHIEVE DESIRES NOISE PROFILE.

| COMPUTER-READABLE MEDIUM 806 | RECORDABLE MEDIUM 808 | COMMUNICATIONS MEDIUM 810 |

FIG. 8

ACOUSTIC NOISE MANAGEMENT THROUGH CONTROL OF ELECTRICAL DEVICE OPERATIONS

CROSS REFERENCE TO RELATED APPLICATIONS

This application claims the benefit of International Patent Application Serial No. PCT/US10/43629 filed on Jul. 29, 2010. The disclosures of the International Patent Application are hereby incorporated by reference for all purposes.

BACKGROUND

Unless otherwise indicated herein, the materials described in this section are not prior art to the claims in this application and are not admitted to be prior art by inclusion in this section.

The use of noise emitting devices such as appliances, computers, entertainment systems, and similar ones, is a common experience for users in their homes and office environments. When using multiple appliances or devices simultaneously, the sounds emitted during the operation can be additive and can cause the overall noise levels within an area to be exceedingly annoying or disruptive. In addition to the level of noise, a frequency of noise can also have a disturbing effect on people. For example, high pitched sounds may affect some people more than others, while low humming noises may disturb another group of people.

The effect of noise levels and/or frequency may also depend on a current status of a person. For example, someone operating an electrical saw (or a vacuum cleaner) is unlikely to be impacted by the sound of a garbage disposal unit. On the other hand, the noise of a dishwasher, even in a quiet mode, may disturb a person listening to classical music. At times when the noise levels are too high (or frequency unacceptable), a person may manually disable or turn down one or more devices in order to achieve a more desirable acoustic environment within an area. For example, a person listening to music may desire to inhibit noisy appliances from operating to minimize the noise within the entertainment area. Thus, the person may manually disable a loud garbage disposal, turn off the washing machine, or set a refrigerator temperature to a higher value to shut down its compressor. Determining which devices (or combination of devices) cause the annoying noise level/frequency, adjusting their operations, and subsequently readjusting their operations (e.g. turning off/on, down/up, etc.) may be a difficult task to manage manually.

The present disclosure recognizes that there are challenges in determining noise levels and/or frequency components within an area and controlling a plurality of noise emitting devices to achieve an ideal noise profile.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

The present disclosure generally describes methods for managing noise levels by controlling operational aspects of noise emitting devices within one or more predefined areas. Example methods may include determining a desired noise profile within one or more predefined areas, detecting and monitoring noise levels within the predefined area(s), and/or adjusting the operation of one or more of a plurality of noise emitting devices to achieve the desired noise profile within the predefined area(s).

The present disclosure also generally describes systems for managing noise levels by controlling the operation of noise emitting devices within one or more predefined area(s). Example systems may include one or more sound detection devices used to detect sounds emitted from one or more sound emitting devices in the predefined area and a controller adapted to adjust the operation of one or more of the devices to achieve a desired noise profile within the predefined area.

The present disclosure further describes computer-readable storage mediums having instructions stored thereon for managing noise levels by controlling the operation of noise emitting devices. Example instructions stored on the computer-readable storage medium may include capturing noise measurements associated with the operation of one or more noise emitting devices in a predefined area and determining a noise profile for each of the noise emitting devices. Some instructions may further include selecting a desired noise level within a predefined area, detecting noise levels within the predefined area and adjusting the operation of one or more of the noise emitting devices. The instructions may further include adjusting the operation of the noise emitting devices based on their noise profiles such that the detected noise level is below the desired noise level by communicating with the electrical devices through on or more of a power line, a wired connection, and/or a wireless connection.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
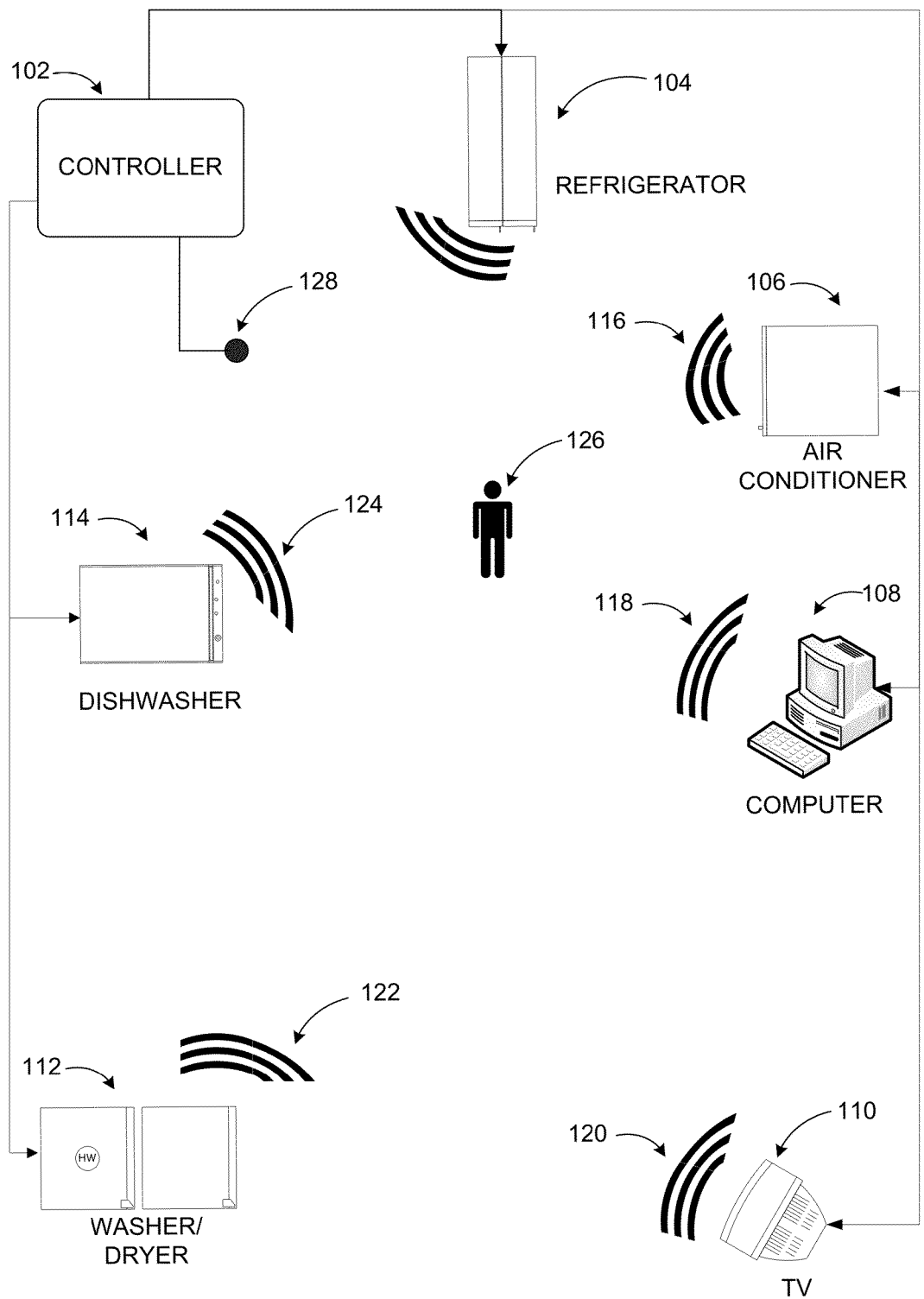
FIG. 1 illustrates an example centralized noise management system where a controller controls operations of noise emitting devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to automatically managing noise levels within a predefined area by controlling operational aspects of one or more noise emitting devices.

Briefly stated, technologies are generally described for automatically managing noise profile in a predefined area by determining a desired noise profile within the predefined area, monitoring noise levels and/or other characteristics of the noise within the predefined area, and adjusting operational aspects of one or more noise emitting devices in order to achieve the desired noise profile within the predefined area. Other characteristics may include, single frequency, spectrum/band of frequencies, periodicity, level, and other criteria in addition to frequency. A noise management system according to embodiments may be either centrally controlled or organized in a distributed manner with control modules on individual noise emitting devices interacting through wired or wireless media. Furthermore, the adjustment of the operations of the noise emitting devices in order to achieve the desired noise profile may be accomplished through computing an acoustic transfer function or measuring actual noise levels/characteristics.

FIG. 1 illustrates an example centralized noise management system where a controller directly controls operations of noise emitting devices, according to at least some embodiments described herein. The example system in FIG. 1 illustrates a home environment with appliances and similar electrical devices generating various levels (and frequencies) of noise, which may be automatically managed by a controller arranged in communication with the devices. A noise management system according to embodiments is not limited to home implementations, however. Noise profiles of predefined areas in office, laboratory, factory, and similar areas may be managed using the principles discussed herein.

A noise management system may be configured to control the operation of noise emitting devices such that a desired noise profile may be achieved and maintained within a predefined area based on varying circumstances and/or user preferences. As shown in FIG. 1, a plurality of noise emitting devices may contribute to the noise profile of the predefined area. The noise emitting devices may include electrical devices such as a computer 108, air conditioner 106, television 110, and/or household appliances such as a refrigerator 104, washing machine and dryer 112, or a dishwasher 114. Of course, a number of other devices may also contribute to the noise profile. These devices may create noise components 116, 118, 120, 122, 124, etc. when they operate.

Controller 102 may be coupled to the noise emitting devices through wired or wireless means and control their operation to adjust the noise profile of the predefined area based on detecting noise levels/frequencies through one or more sound detection devices (e.g. microphone 128). The noise profile for the predefined area may include single frequency, spectrum/band of frequencies, periodicity, level, and other criteria associated with the noise. Controller 102 may be configured to receive/compute/store one or more noise profiles for the predefined area. For example, a low overall noise level may be desired when a person is listening to soft music (or watching TV) in the predefined area. On the other hand, the person may specify certain noise frequency components that annoy them, such that those components may be suppressed or reduced in level whenever the person is in the predefined area. In some examples, suppression may be accomplished by turning off a device that is emitting the undesired noise frequency component or changing an operational mode of the device. In other examples, suppression may be accomplished by modifying the operation of the device such that the noise levels and or frequency characteristics change to less irritating characteristic (e.g. the frequency of the noise is changed by changing the operating mode of the device).

The noise emitting devices may emit a variety of different noise levels over many frequencies when they are in various operation modes. For example, a dishwasher may emit a signal sound such as a high frequency beep to indicate that a cycle is finished, and it may emit a low frequency noise while washing the dishes. As another example, a refrigerator may emit loud sounds when its cooling compressor is active while it may emit minimal noise when the cooling compressor is inactive or idle.

Controller 102 may be configured to monitor noise levels and/or noise frequency components in the predefined area through one or more sound detection devices such as microphone 128. In some examples, the sound detection devices may be distributed around the predefined area for better detection of noise levels throughout the area. In other examples, each of the sound detection devices may be positioned at different orientations so that the noise sourced from different directions may be monitored and/or identified. The sound detection devices may also be directly or indirectly coupled to the controller 102. For example, at least some of the sound detection devices may be an integrated or externally coupled module of one or more of the noise emitting devices themselves (e.g. a microphone of computer 108). More examples of how sound detection devices may be used to monitor the noise profile of the predefined area are discussed below.

At a basic level, controller 102 may be configured to instruct one or more devices to turn themselves off when a detected noise profile does not match a desired noise profile (e.g. overall noise level is determined to be higher than a desired noise level or some undesired noise frequency components are detected). According to other embodiments, controller 102 may be configured to compute an acoustic transfer function for the predefined area and determine which operation modes of noise emitting devices may cause a desired noise profile to be disturbed, and then adjust those operation modes. For example, certain cycles or operating modes of washing machine and dryer 112 may generate a high pitch noise component that may be undesirable for the person in the predefined area. Thus, controller 102 may be configured to postpone those operation modes or in some cases accelerate them if the desired noise profile is scheduled ahead (e.g. the controller knows the person will be watching TV at a certain time, it may accelerate the undesired operation modes to have them completed before the scheduled TV watching time).

In practical situations, different noise components 116, 118, 120, 122, 124 may be generated at different times and may not necessarily be purely additive. Thus, controller 102 may be adapted to determine alternative scenarios for bringing the noise profile into compliance with the desired noise profile based on turning off one or more devices or modifying operating modes of some of the devices. Controller 102 may then be configured to compare those alternative scenarios to power consumption, needed operations (e.g. an internal temperature of the refrigerator 104 may have to be maintained above a certain temperature), and implement one of them. Controller 102 may also be configured to adjust the operations of the noise emitting devices based on user input. For example, the controller 102 may be configured to modify the operating mode of a washing machine and/or dryer so that it runs at a slower or faster spin rate to effectively shift the frequency spectrum associated with the noise.

Adjustment of operating modes for noise emitting devices such as appliances may be subject to limitations and other considerations. For example, the compressor of a refrigerator may be slowed or turned off to mitigate noise, but refrigerators generally have an upper limit for their internal temperature. Thus, a system according to embodiments may monitor the temperature of the refrigerator and ensure that the upper limit is not exceeded due to operating mode changes for noise mitigation. Similarly, leaving wet items in a dryer for prolonged periods may result in mildew or comparable undesired consequences. Thus, operating mode changes for the dryer may be subject to similar limitations. Other noise emitting devices may also be associated with comparable limitations based on the nature of their functionality.

Figure 2:
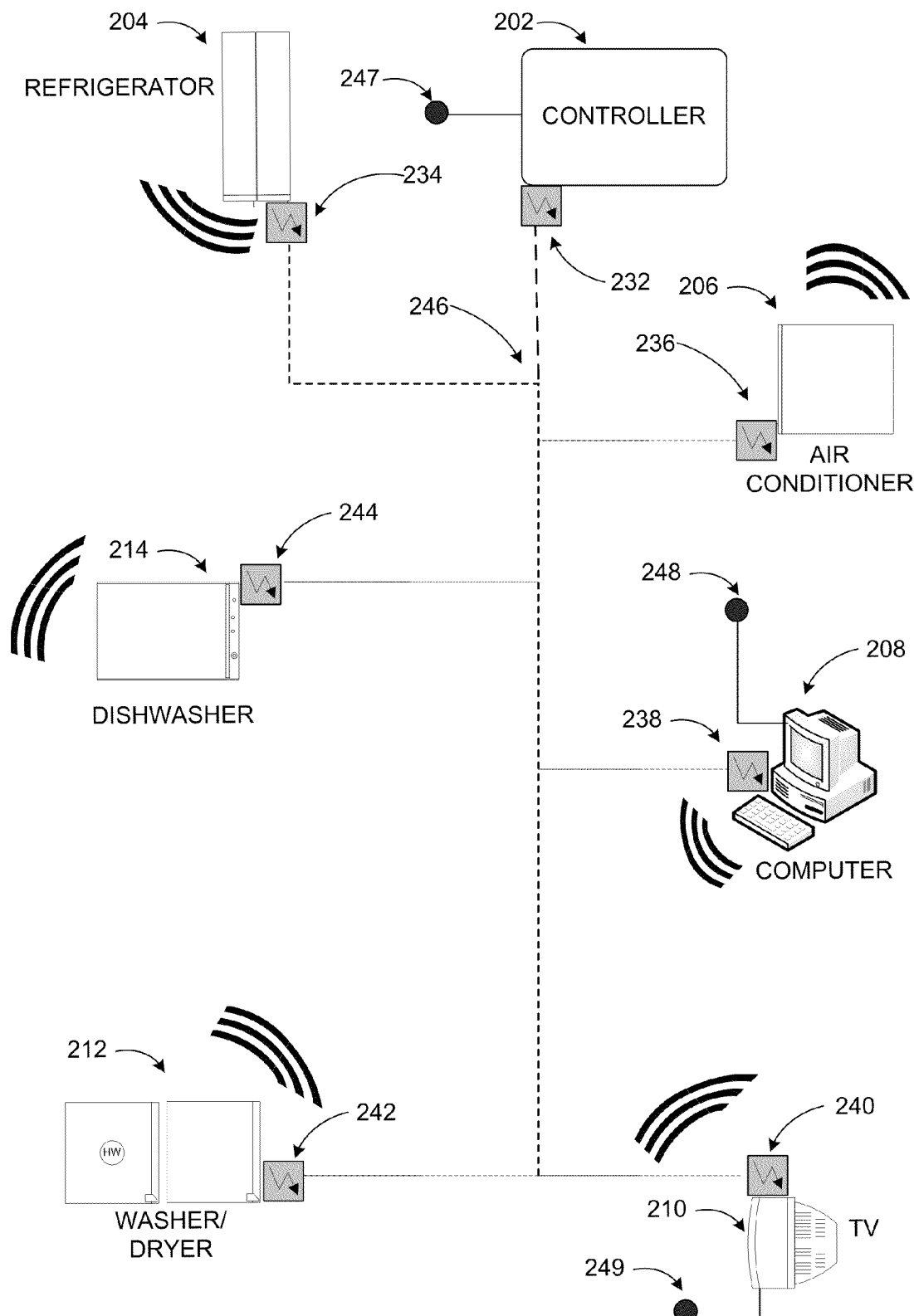
FIG. 2 illustrates an example integrated noise management system for controlling operations of noise emitting devices.

FIG. 2 illustrates an example integrated noise management system for controlling operations of noise emitting devices, in accordance with at least some examples described herein. A system according to embodiments may be implemented in homes, offices, school buildings, laboratories, factories, hospitals, and comparable environments, where noise control may be desired.

In the example system shown in FIG. 2, electrical devices such as a computer 208, air conditioner 206, television 210, and/or household appliances such as a refrigerator 204, washing machine and dryer 212, or dishwasher 214 may be the sources of noise in the predefined area. Controller 202 may be configured to detect a noise profile of the predefined area through one or more sound detection devices, which may be coupled directly to the controller (247) or to individual devices such as microphone 248 of computer 208 or microphone 249 of television 210.

According to some embodiments, controller 202 may be configured to centrally manage detection of noise levels (and frequencies), comparison to desired noise profile(s), and adjustment of operational aspects of the devices by communicating through wired or wireless means (246) with the devices. Some or all of the devices may be configurable to report their operating modes to the controller 202 and receive instructions to modify their operating modes. In other cases, external modules such as modules 234, 236, 238, 240, 242, and 244 may be coupled to existing devices and configured to perform communication and control of operating modes. Even the controller 202 may be a general purpose computing device fitted with a special module 232 that is configured to facilitate communication with the devices. According to yet other embodiments, the management of the acoustic noise in the predefined area may be done in a distributed manner by configuring one or more of the modules 234, 236, 238, 240, 242, 244, to collaboratively operate with, single frequency, spectrum/band of frequencies, periodicity, level, and other criteria controller 202.

According to some embodiments, a calibration process for determining an acoustic transfer function may include causing sounds to be emitted from distinct sound sources and/or from noise emitting devices themselves. The emitted sounds may include long or short tones of a single frequency or multiple frequencies that are part of regular operation of the device, special tones designed for the calibration of the system, or normal operational sounds that may be maximized or minimized for calibration purposes. Moreover, emitted tones may be swept across selected frequency spectra such that different spectra can be captured by controller 202.

The calibration process may also be performed at device level by the noise emitting devices. For example, every device except a device under test may be initially turned off. Controller 202 may be configured to communicate with the device under test to cause the active device to run through all operating modes. While the device under test runs through the operating modes, controller 202 may be configured to capture the sounds emitted. Then, controller 202 may subsequently build a sound profile for the appliance/device using the captured sounds. The profile may include a listing of a predefined number of peak frequencies and corresponding sound levels for each operating mode for the device under test. The device profile may further include a total sound pressure level (e.g. a sum of all sound levels squared, square rooted, etc.) for each operating mode. Similar information may be obtained and stored for all operating modes of the device under test.

During the monitoring mode, controller 202 may be configured to retrieve the possible operating modes for each device in the predefined area, examine the possible changes to the current operations of each device, and determine if changing the operating mode of one or more devices may be expected to lower the noise profile for the predefined area in the desired way. In some other examples, the sound profiles for various devices may be downloaded or retrieved from a database (similar to a video card driver, but for sound profiles for appliance). The download can be accomplished through any variety of methods such as downloading from a local file store or downloading from a remote file store (e.g., via the Internet).

According to an example scenario, noise levels of active noise emitting devices may be detected over a range of frequencies. The detected noise levels for different frequency components may be compared to an applicable noise profile, which may be user selected or automatically determined by the system based on inference, time or day, ambient noise levels, and similar factors. If the detected levels at selected frequencies are determined to be above the applicable noise profile levels, available operating modes for the active noise emitting devices may be reviewed and possible alternate operating modes for one or more of the currently operated devices may be determined (e.g., by controller 202). Once a suitable possible alternate operating mode that provides a lower noise level is determined, the operating mode(s) for the one or more devices may be changed to the alternate operating mode(s).

According to another example scenario, the peak noise amplitude for specific frequencies may be evaluated (e.g., by controller 202). If a large number of high frequency noise is present and little low frequency noise, then one of the devices that is contributing to high frequency noise may be selected and operated in an another mode to move the frequency characteristic of the detected noise to the lower frequencies. For example, a high speed dryer or washing machine may generate high frequency noise due to the spin speed. In some examples, the spin speed may be lowered (e.g., via controller 202) so that the frequency characteristics of the overall noise in the predefined area is effectively lowered. In some other examples, the spin speed may be raised (e.g., via controller 202) so that the frequency characteristics of the overall noise in the predefined area is effectively moved to higher frequencies. In some other cases the operating modes for some devices may be changed to vary the frequency of the noise from low to high over time, while the operating modes for other devices may be changed to vary the frequency of the noise from high to low over time such that the frequencies associated with the noise can be spread over time. Alternatively, the user may be enabled to select a noise profile specifying certain frequencies that the user finds annoying.

Figure 3:
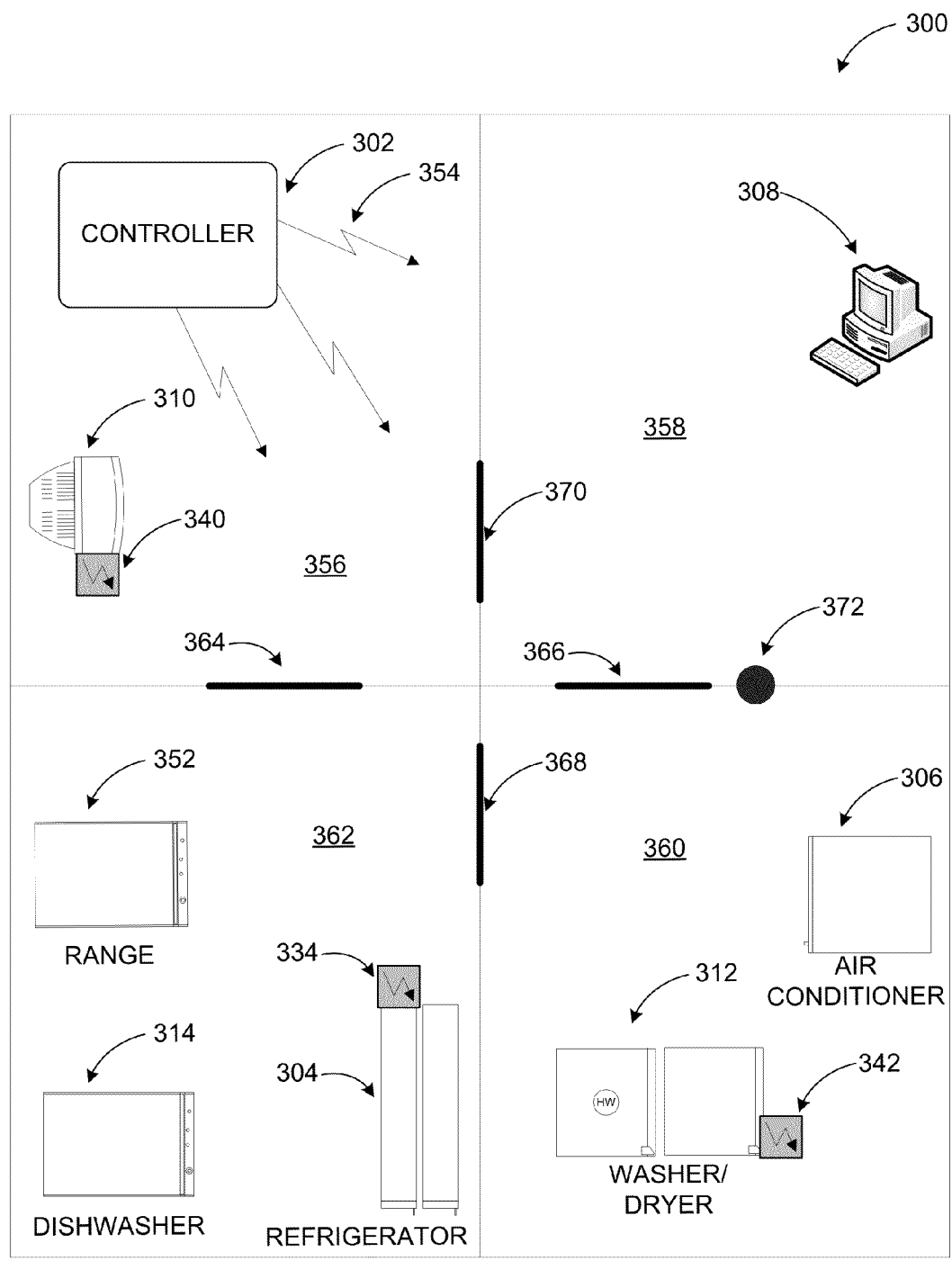
FIG. 3 illustrates an example noise management system configured to monitor and control noise profiles in a plurality of predefined areas.

FIG. 3 illustrates an example noise management system configured to monitor and control noise profiles in a plurality of predefined areas, arranged in accordance with at least some embodiments described herein. FIG. 3 includes a controller 302 that is configured to monitor a plurality of predefined areas 356, 358, 360, and 362, and adjust the operation of one or more electrical devices 306, 308, 312, 314, 334, 352, and 310 to achieve a desired noise profile in each the plurality of predefined areas.

Controller 302 may be configured to communicate with the various devices through wired or wireless (354) communication systems. As discussed above, some of the devices may include relevant circuitry configured to interact with the controller 302 (e.g. computer 308, air conditioner 306, range 352, etc.) while others may be fitted with an external module (e.g. 340, 334, 342) adapted to communicate with controller 302. The controller 302 may be configured to calibrate the noise management system for monitoring each of the separate predefined areas 356, 358, 360, and 362 independently or jointly. The controller 302 may be configured to command one or more of the devices in each of the separate predefined areas 356, 358, 360, and 362 to emit special sounds and/or to cycle through operational modes such that the system (e.g., via the controller 302) can determine the noise profile associated with each device within one or more of the predefined areas. The controller 302 may also be configured to initiate sound emission from an independent sound source 372 in a predefined range of frequencies and noise levels such that the controller 302 can evaluate the sound emissions to determine an acoustic transfer function for the predefined areas and to calibrate the noise management system.

The controller 302 may then be configured to monitor the noise profile in one or more of the predefined areas 356, 358, 360, and 362 and adjust the operation of one or more of the noise emitting devices for each of the monitored predefined areas. If the noise profile (e.g. noise levels for selected frequencies) exceed the requirements of a desired noise profile for a particular predefined area, then controller 302 may be configured to select an operating mode for one or more of the plurality of noise emitting devices based on a comparison of the corresponding noise profile for each device and the desired noise profile for the predefined area.

Controller 302 may further be configured to detect when a door (e.g. 364, 366, 368) separating adjacent predefined areas is closed, causing a different noise profile within a predefined area. The controller 302 may then be configured to re-calibrate the noise management system for a predefined area by measuring a new acoustic transfer function within the area and determining a new noise profile using the above described methods.

In one example implementation, a user may specify in a preference that when the television 310 is operating, one or more of the other noise emitting devices within the predefined areas should not operate or should operate in a mode that emits minimal noise levels. The user may program this preference with the controller 302 and the controller 302 may then be configured to monitor the predefined area 356, where television 310 is located. Controller 302 may turn some of the other noise emitting devices off and change others to a quieter operating mode when the television 310 operates. In another example implementation, controller 302 may be configured to use a sound detection device to detect that television 310 is operating based on the detection of sounds emitted from the television 310 and controller 302 may be configured to inferentially determine that since television 310 is in operation then the noise levels of the other noise emitting devices should be minimized. The controller 302 may then adjust such noise emitting devices accordingly.

In yet another example, controller 302 may be configured to receive an indication that the user is absent from the predefined area, and the controller 302 may suspend adjustment of the noise emitting devices during the user's absence. Controller 302 may also be configured to adjust one or more of the plurality of noise emitting devices to operate in maximum noise emitting mode when a user is absent such that the devices can be operated in a quieter mode when the user is present (e.g. turning on the compressor of refrigerator 304 or a heavy duty cycle of washer/dryer 312). Controller 302 may also adjust one or more of the plurality of noise emitting devices to operate in maximum noise emitting mode when the controller 302 detects that the user is operating a loud device such as an electrical saw and will not be affected by loud operation noises from devices within the predefined area.

In a further example implementation, the noise management system may be configured to integrate the adjustment of the operation of noise emitting devices to a security application such that a predefined area is monitored for increased noise levels indicating a breach in security within one or more of the plurality of predefined areas.

Figure 4:
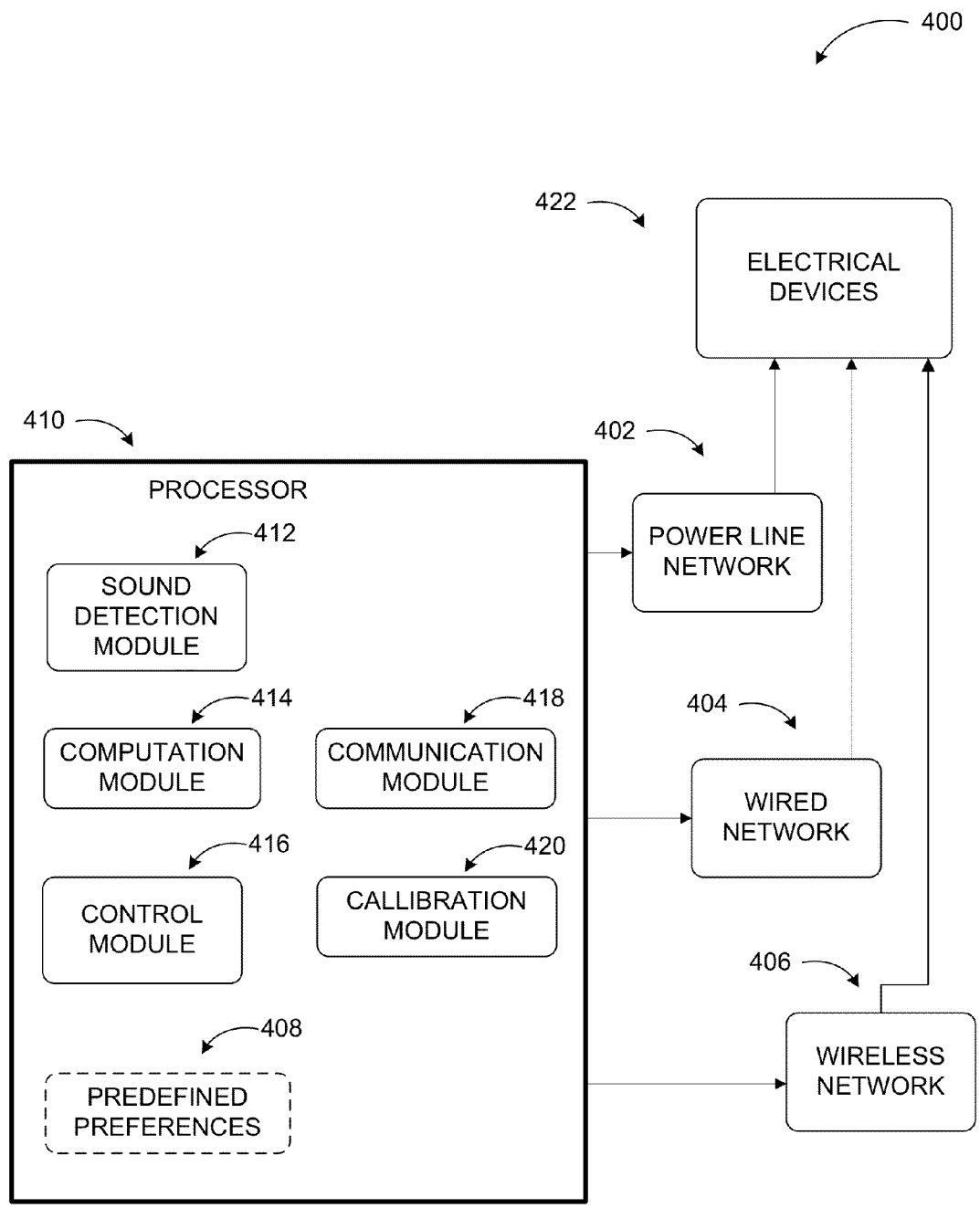
FIG. 4 illustrates an example special purpose processor, which may be used to implement a noise management system for controlling operations of noise emitting devices.

FIG. 4 illustrates a special purpose processor, which may be used to implement noise management system for controlling the operation of noise emitting devices according to one or more embodiments described herein. The noise management system 400 can be, for example, as described in FIG. 1, 2 or 3. An example noise management system 400 may include a processor 410, and one or more noise emitting electrical devices 422.

The processor 410 may include functional modules such as a sound detection module 412, a computation module 414, a communication module 418, a calibration module 420, and a control module 416. These modules may employ data including, but not limited to, noise level data, frequency data, acoustic transfer function data, user preference data, and calibration data. Each of the illustrated functional modules may be implemented as either hardware, software, or some combination thereof. In some examples, the functionality of specific modules may be integrated together with the functionality of one or more other modules. In some other examples, the functionality of one or more modules may be divided into additional functional modules.

Processor 410 may be configured to interact with one or more of a plurality of noise emitting devices (i.e. electrical devices 422) through one or more of a power line 402, a wired network 404 and/or a wireless network 406. The communications may be established over different networks for different electrical devices 422 or over the same network. By executing instructions for its special modules, processor 410 may be configured to monitor and/or control the operation of noise emitting devices within a predefined area.

Sound detection module 412 may configure processor 310 coordinate monitoring of noise profile(s) in one or more predefined areas through one or more sound detection devices coupled to processor 410 or one or more of the electrical devices 422. Computation module 414 may configure processor 414 to compute noise profiles for the predefined areas based on detected noise levels and/or frequencies, as well as compute an acoustic transfer function for the predefined area(s) such that an impact of noise from individual electrical devices can be determined computationally (as opposed to or in addition to measurement). Control module 416 may configure processor 410 to interact with individual electrical devices 422 through communication module 418 and transmit instructions for modifying operational modes, turning on/off, etc. in order to match a determined noise profile to a desired noise profile. Control module 416 may configure processor 410 to retrieve optional predefined preferences 408 in determining the desired noise profile and/or infer the desired noise profile from user actions (e.g. listening to soft music, watching TV, talking on the phone, etc.).

Communication module 418 may be utilized by processor 410 to facilitate communications with the electrical devices 422 over the listed communication networks and/or others. For example, wireless communications may include long or short range radio frequency (RF) communications (e.g. Wide Area Networks "WANs", Wireless Local Area Networks "WLANs", Personal Area Networks "PANs", etc.), optical communications (e.g. infrared), and similar ones. Wired communications may include standard or proprietary communication networks such as Ethernet. Calibration module 420 may configure processor 410 to perform a calibration process causing distinct sound sources or electrical devices themselves to emit sounds and/or operational noises and determining noise profile(s) based on detection of the emitted sounds and/or operational noises in the predefined area.

Processor 410 may include additional or fewer modules, and may be implemented as a standalone control unit or as an integral module within a larger device such as a home automation control center, home security control center, etc. While embodiments have been discussed above using specific examples, components, and configurations in FIG. 1 through 4, they are intended to provide a general guideline to be used for implementing a noise management system for controlling the operation of noise emitting devices within predefined area(s). These examples do not constitute a limitation on the embodiments, which may be implemented using other components, sound detection, calibration, noise profile monitoring, or sound measurement schemes, and/or configurations using the principles described herein.

Figure 5:
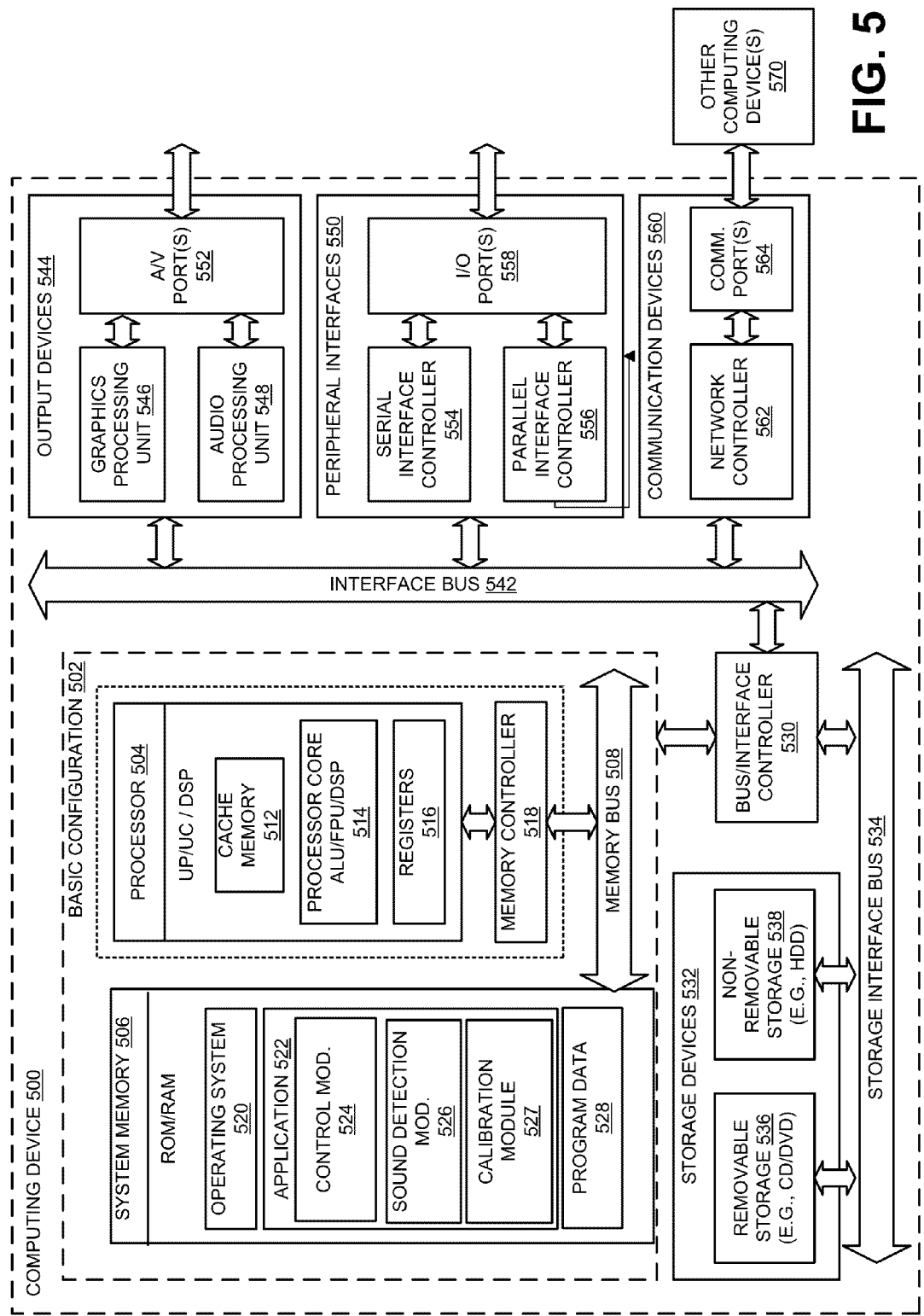
FIG. 5 an example general purpose computing device, which may be used to control a noise management system.

FIG. 5 illustrates a general purpose computing device 500, which may be adapted to control an example noise management system that is arranged according to at least some embodiments of the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level cache memory 512, a processor core 514, and registers 516. Example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 528. Application 522 may include a control module 524 that may be arranged to adjust the operational of one or more noise emitting devices as discussed above. Application 522 may also include a sound detection module 526 that may be arranged to detect varying noise levels, sound frequencies and noise profiles within a predefined area. Application 522 may also include a calibration module 527 that may be arranged to determine an acoustic transfer function for a predefined area and/or a noise profile within one or more predefined areas. The functions provided by the various modules may be combined together into fewer modules, or separated into additional modules without departing from the spirit of the present disclosure. Program data 528 may include any data associated with monitoring and controlling the noise emitting devices, inferred noise profile preferences and user defined preferences as discussed above (e.g., FIGS. 1, 2, 3, and 4). In some embodiments, application 522 may be arranged to operate with program data 528 on operating system 520 such that a noise profile and the operation of noise emitting devices may be controlled as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 542 for facilitating communication from various interface devices (e.g., output devices 544, peripheral interfaces 550, and communication devices 560) to basic configuration 502 via bus/interface controller 830. Example output devices 544 include a graphics processing unit 546 and an audio processing unit 548, which may be configured to communicate to various external devices such as a display or speakers via one or more A/V ports 552. Example peripheral interfaces 550 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 532, which may be arranged to facilitate communications with one or more other computing devices 560 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations. Moreover computing device 500 may be implemented as a networked system or as part of a general purpose or specialized server.

Figure 6:
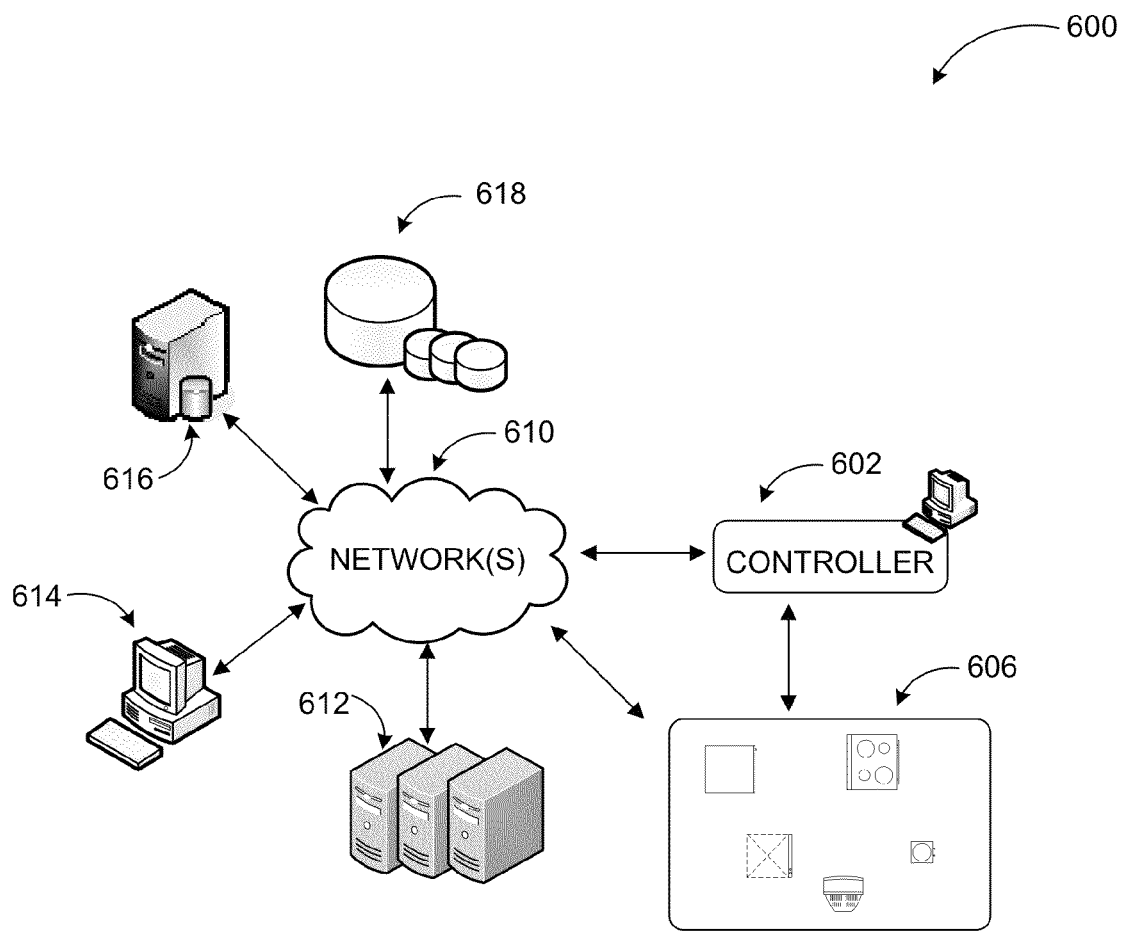
FIG. 6 illustrates an example networked environment, where a noise management system according to embodiments may be implemented.

FIG. 6 illustrates a networked environment, where a noise management system may be implemented in accordance with at least some embodiments described herein. A control system managing the operation of noise emitting devices may be implemented through separate applications, one or more integrated applications, one or more centralized services, or one or more distributed services on one more computing devices. FIG. 6 illustrates an example of a distributed system 600 implementation through networks 610.

As discussed previously, sound detection, calibration, noise profile monitoring, adjustment of noise emitting devices operations may be controlled by a controller 602. Noise emitting devices 606 may be configured to provide some of the controls and/or data collection for the operations through sound detection devices and attached control/communication modules. Controller 602 (e.g. a general purpose computing device) may be configured to collect noise profile data, acoustic transfer function data, frequency data, user preference data, user inferred data; monitor a predefined area for varying noise levels; and/or adjust the operation of noise emitting devices within one or more predefined areas. Controller 602 may also be configured to communicate such data to an application or service executed on computing device 614 or one or more of the servers 612 through network(s) 610. The application or service may be adapted to manage one or more of noise management systems, maintain noise profile and user preference data, provide initial configuration information to controller 602, and perform similar tasks. Noise profile, user preference data, and other data associated with the adjusting the operation of noise emitting devices may be stored in one or more data stores such as data stores 618 and be directly accessible through network(s) 610. Alternatively, data stores 618 may be managed by a database server 616.

Network(s) 610 may comprise any topology of servers, clients, switches, routers, modems, Internet service providers (ISPs), and any appropriate communication media (e.g., wired or wireless communications). A system according to embodiments may have a static or dynamic network topology. Network(s) 610 may include a secure network such as an enterprise network (e.g., a LAN, WAN, or WLAN), an unsecure network such as a wireless open network (e.g., IEEE 502.11 wireless networks), or a world-wide network such (e.g., the Internet). Network(s) 610 may also comprise a plurality of distinct networks that are adapted to operate together. Network(s) 610 can be configured to provide communication between the nodes described herein. By way of example, and not limitation, network(s) 610 may include wireless media such as acoustic, RF, infrared and other wireless media. Furthermore, network(s) 610 may be portions of the same network or separate networks.

Example embodiments may also include methods. These methods can be implemented in any number of ways, including the structures described herein. One such implementation may be facilitated by machine based operations with devices of the type described in the present disclosure. Another optional implementation is for one or more of the individual operations of the methods described herein to be performed in conjunction with one or more human operators performing some of the operations while other operations are performed by machines (e.g., devices adapted to perform operations). Human operators need not be collocated with each other, but instead can be located about a machine that performs a portion of the overall program or process. In other examples, the human interaction can be automated such as by pre-selected criteria that are machine automated.

Figure 7:
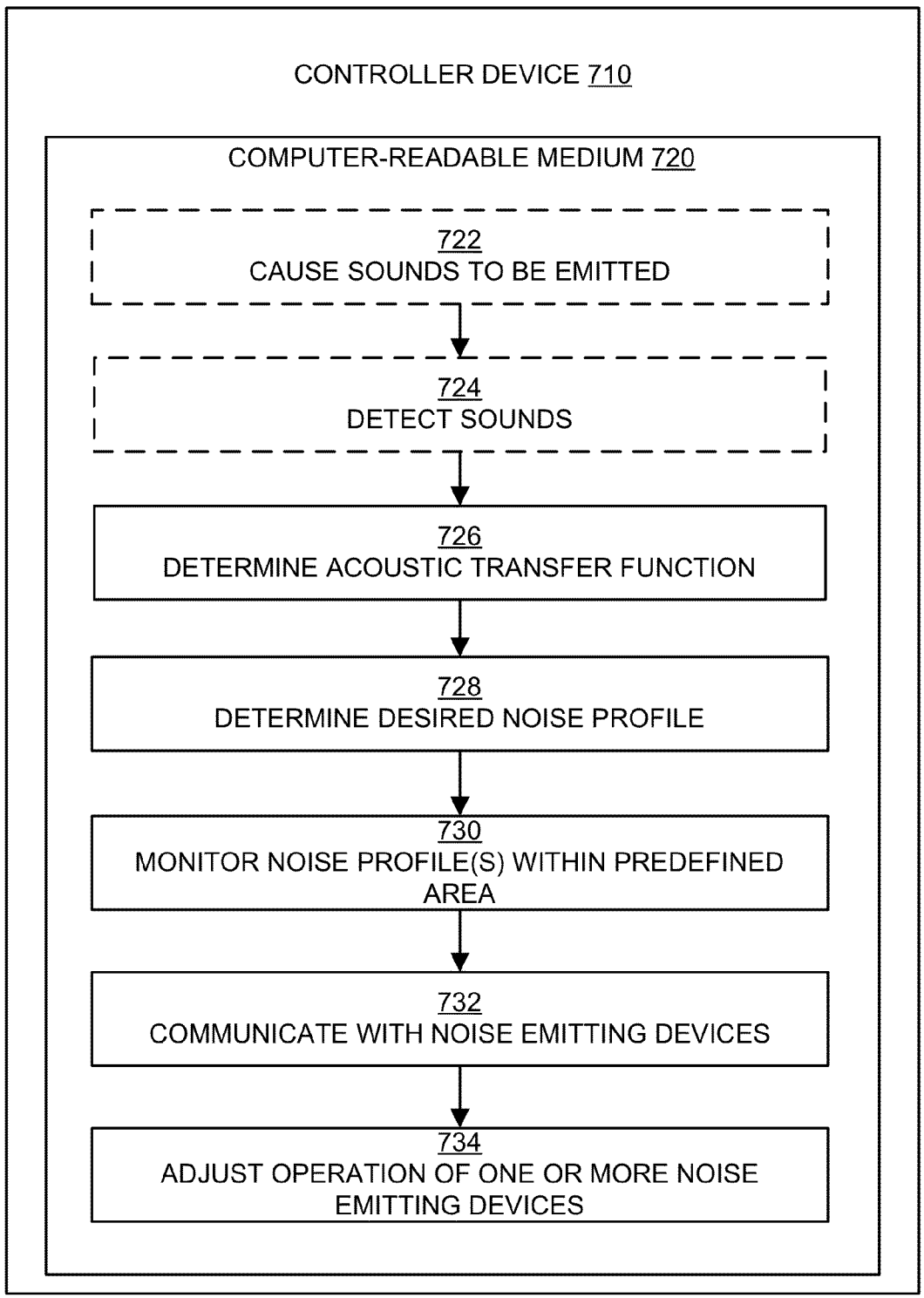
FIG. 7 illustrates a block diagram of an example controller device for performing an example method of managing noise profiles.

FIG. 7 illustrates a block diagram of an example controller device 710 for performing an example method through a computing device (e.g., processor 410 in FIG. 4), arranged in accordance with at least some embodiments of the present disclosure. In some examples, as shown in FIG. 7, computer readable medium 720 may include machine readable instructions that, when executed by a computing device (e.g., processor 410, computing device 500, controller device 710, etc.) adapt the computing device to provide at least a portion of the functionality described above with respect to FIG. 1 through FIG. 6. For example, referring to controller device 710, one or more modules of controller device 710 may be configured to undertake one or more of the operations shown in FIG. 7.

A process of acoustic noise management through controlling the operation of one or more of a plurality of noise emitting devices may begin with operation 722, "CAUSE SOUNDS TO BE EMITTED." At operation 722, a controller may initiate sound emission from one or more of a plurality of noise emitting devices 422 and/or an independent sound source 372.

Operation 722 may be followed by operation 724, "DETECT SOUNDS." At operation 724, noise levels and frequencies may be received at a sound detection module 128. The received noise data may processed and calibrated to determine a noise profile associated with one or more of a plurality of noise emitting devices within a predefined area.

Operation 724 may be followed by operation 726, "DETERMINE ACOUSTIC TRANSFER FUNCTION." At operation 726, an acoustic transfer function may be determined for one or more of a plurality of predefined areas. The determinations may be made by the respective sound detection, computation, and calibration modules (e.g. 412, 414 and 420, respectively) and/or by a controller based on data provided by the sound detection, computation, and calibration modules. The acoustic transfer function may be used to determine noise profiles for predefined areas computationally in place of or in addition to detecting noise levels.

Operation 726 may be followed by operation 728, "DETERMINE DESIRED NOSE PROFILE." At operation 728, a user defined preference may be programmed into the controller, or the controller may use user preference data and noise profile detection data to determine a desired noise level and noise profile within one or more of a plurality of the predefined areas. The desired noise profile may also be determined by the controller based inference (e.g. a user's current actions). Ambient noise, user defined preferences, inferred user preferences, time of day, day of week, energy usage, and/or operation of other noise emitting devices may be used as factors in determining the desired noise profile.

Operation 728 may be followed by operation 730, "MONITOR NOISE PROFILE(S) WITHIN PREDEFINED AREA." At operation 730, the noise profile within one or more of a plurality of predefined areas may be monitored by the controller. According to some embodiments, the controller 102 may monitor the noise profiles through sound detection devices (128) directly coupled to the controller or sound detection devices (248) integrated into one or more of the plurality of noise emitting devices.

Operation 730 may be followed by operation 732, "COMMUNICATE WITH NOISE EMITTING DEVICES." At operation 732, the controller may communicate with one or more of the noise emitting devices to adjust operational modes of said devices according to a desired noise profile. According to some embodiments, the controller may directly communicate with the devices, while in other embodiments the controller may communicate with one or more of the noise emitting devices using a communication module 418 and integrated modules 232, 236 at the noise emitting devices.

Operation 732 may be followed by optional operation 734, "ADJUST OPERATION OF ONE OR MORE NOISE EMITTING DEVICES", where the controller manages and adjusts the operating mode of one or more of the noise emitting devices in order to achieve a desired noise profile within one or more predefined areas. The controller may adjust the operation based on one or more of a predefined user preference, a time of day, an operation of another device, an ambient noise level within the predefined area, a user indication, inferred user preference, and/or an overall energy consumption of the electrical devices. The operational modes may include being turned on or off, selected operating cycles, power levels, and comparable aspects. As discussed previously, the processors and controllers performing these operations are example illustrations and should not be construed as limitations on embodiments. The operations may also be performed by other computing devices or modules integrated into a single computing device or implemented as separate machines.

The operations discussed above are for illustration purposes. A noise management system may be implemented by similar processes with fewer or additional operations. In some examples, the operations may be performed in a different order. In some other examples, various operations may be eliminated. In still other examples, various operations may be divided into additional operations, or combined together into fewer operations.

Figure 8:
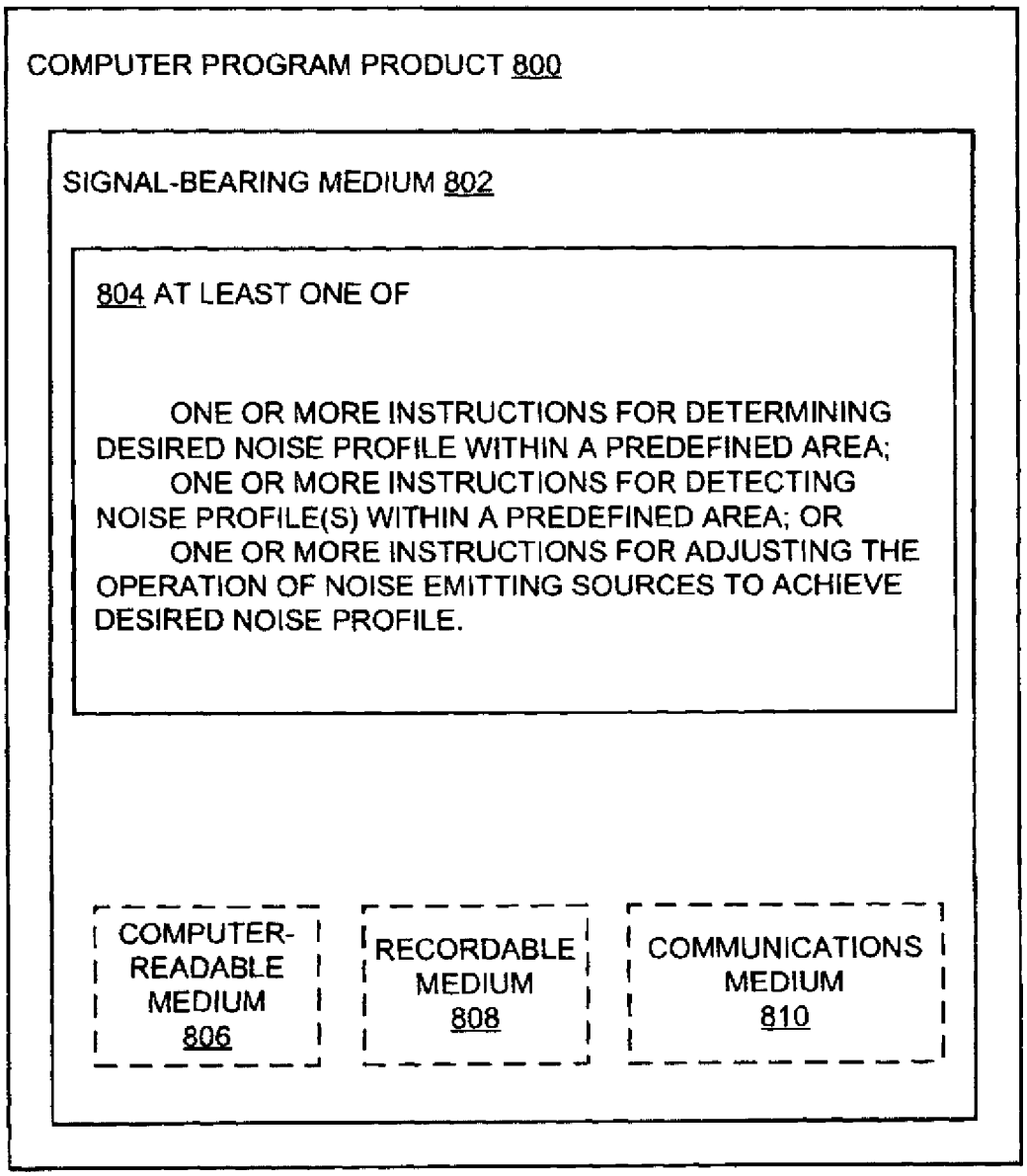
FIG. 8 illustrates a block diagram of an example computer program product, all arranged in accordance with at least some embodiments described herein.

FIG. 8 illustrates a block diagram of an example computer program product 800 arranged in accordance with at least some embodiments described herein. In some examples, as shown in FIG. 8, computer program product 800 may include a signal bearing medium 802 that may also include machine readable instructions 804 that, when executed by, for example, a processor or controller or computing device, may provide the functionality described above with respect to FIG. 1 through FIG. 7. Thus, for example, referring to special purpose processor 410, one or more of the modules 412, 414, 416, 418, and/or 420 may undertake one or more of the tasks shown in FIG. 8 in order to achieve a desired noise profile within a predefined area as described herein. Some of those instructions may include determining desired noise profile, detecting noise profile(s) within the predefined area, and/or adjusting operation of noise emitting devices to achieve the desired noise profile.

In some implementations, signal bearing medium 802 depicted in FIG. 8 may encompass a computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of the processor 410 by an RF signal bearing medium 802, where the signal bearing medium 802 is conveyed by a wireless communications medium 810 (e.g., a wireless communications medium conforming with the IEEE 802.11 standard).

In accordance with some embodiments, a method for managing noise levels by controlling operation of noise emitting devices may include identifying a desired noise profile of a predefined area, monitoring noise characteristics within the predefined area, and if the noise characteristics do not match the desired noise profile, adjusting an operation of one or more of a plurality of noise emitting devices to achieve the desired noise profile of the predefined area. The method may also include initiating sound emission from one or more of the noise emitting devices located in the predefined area, capturing noise measurements associated with the sound emission from the one or more noise emitting devices located in the predefined area, and evaluating the captured noise measurements to determine an acoustic transfer function associated with the predefined area.

The operation of one or more of the noise emitting devices may be adjusted based on one or more of: the acoustic function and/or the monitored noise characteristics. Moreover, the method may further include identifying a noise profile associated with one or more of the noise emitting devices based on evaluating the captured noise measurements over a range of frequencies; comparing the identified noise profile to the desired noise profile at a selected frequency among the range of frequencies; determining if the identified noise profile matches the desired noise profile at the selected frequency; and if the identified noise profile is determined not to match the desired noise profile at the selected frequency, adjusting the operation of the one or more noise emitting devices to achieve the desired noise profile.

According to other embodiments, the method may include identifying a noise profile of each of the noise emitting devices at the selected frequency based on one or more of performing pattern matching to identify an already existing noise profile and creating a noise profile from sampled noise measurements; identifying alternate operating modes for the noise emitting devices; and switching at least one noise emitting device to an identified alternate operating mode such that the identified noise profile for the at least one noise emitting device matches the desired noise profile for the same device at the selected frequency. Initiating the sound emission from one or more of the noise emitting devices may include activating one or more of the noise emitting devices to emit one or more of a special tone, an operational tone, and/or operational noise emitted by operating in a standard operating mode associated with the noise emitting device.

Initiating the sound emission from one or more of the noise emitting devices may alternatively include activating a sound source that is different from the noise emitting devices, where the activated sound source emits one or more sounds in a predefined frequency range. The noise characteristics may include one or more of a single frequency, a spectrum of frequencies, a periodicity, and/or a level of the noise. The noise emitting devices may be located either within the predefined area or outside of the predefined area. The noise may be captured within the predefined area through one or more microphones, where each of the microphones are either standalone or affixed to one or more of the noise emitting devices.

The desired noise profile may be determined within the predefined area based on one or more of: user preferences, time of day, day of week, energy usage, and/or ambient noise levels identified within the predefined area. Furthermore, adjusting the operation of the noise emitting devices may include one or more of modifying time of operation of one or more of the noise emitting devices; modifying a duration of operation of one or more of the noise emitting devices; coordinating an operation of two or more of the noise emitting devices; modifying an operational mode of one or more of the noise emitting devices; and/or modifying an energy consumption of one or more of the noise emitting devices.

The operation of the noise emitting devices may be adjusted based on one or more of: a predefined rule, a time of day, an operation of another device, an ambient noise level associated with the predefined area, a user indication, and/or an overall energy consumption of one or more of the noise emitting devices. The adjustment of the operation of the noise emitting devices may also be integrated to a security application. The operation of the noise emitting devices may be adjusted by communicating with the noise emitting devices through one or more of a power line, a wired connection and/or a wireless connection. The method may also include receiving an absence indication from a user and suspending adjustment of the operation of the noise emitting devices during an absence of the user.

In accordance with other embodiments, a system for managing noise levels by controlling operation of noise emitting devices may include at least one sound detection device effective to detect sounds in a predefined area from a plurality of electrical devices, where each of the plurality of electrical devices generate sounds when operated; and a controller that is configured to select a desired noise profile associated with the predefined area, monitor noise of the predefined area through the at least one sound detection device, and adjust an operation of one or more of the plurality of electrical devices until the monitored noise approximately achieves the desired noise profile within the predefined area. The desired noise profile may be selected as one of: total ambient noise in the predefined area, a noise component at one or more selected frequencies, or a noise component from one or more selected electrical devices.

The controller may be further configured to command one or more of the electrical device to cycle through operating modes; identify a noise profile associated with each electrical device based on operating modes and frequencies of emitted noise associated with each electrical device; and select an operating mode for one or more of the electrical devices based on a comparison of the corresponding noise profile of each electrical device and the desired noise profile for the predefined area. The controller may also identify a combined noise profile for two or more electrical devices when the electrical devices operate synchronously and select the operating mode for the two or more electrical devices based on a comparison of the combined noise profile and the desired noise profile for the predefined area.

The controller may be a separate device adapted to manage an operation of the electrical devices centrally through one or more of a wired communication and/or a wireless communication. The controller may be a separate module or an integrated module on each of the electrical devices adapted to manage an operation of the electrical devices in a distributed manner. The sound detection device may also be integrated into at least one of the electrical devices. The controller may be further configured to modify one or more of an operation time, an operation duration, an operation mode, and/or an energy consumption of the one or more electrical devices based on one or more of: a predefined rule, a time of day, an operation of another device, an ambient noise level associated with the predefined area, a user indication, and/or an overall energy consumption of the electrical devices.

The electrical devices according to the same embodiments may be household appliances. The desired noise profile may be selected based on one or more of: a direct user indication, an inferred user indication, a time of day, and an ambient noise level associated with the predefined area. The inferred user indication may include user activation and/or user selected operation mode of at least one of the electrical devices. The predefined areas may be monitored and the operation of one or more electrical devices adjusted to achieve the desired noise profile in the plurality of predefined areas.

Further embodiments may be directed to a computer-readable storage medium having instructions stored thereon for managing noise profiles by controlling operation of noise emitting devices. The instructions may include selecting a desired noise profile associated with a predefined area, capturing noise measurements associated with the operation of one or more noise emitting devices in the predefined area, identifying an actual noise profile associated with the predefined area based on the captured noise measurements; and if the actual noise profile does not match the desired noise profile, adjusting an operation of one or more of the noise emitting devices by communicating with the electrical devices through one or more of a power line, a wired connection and/or a wireless connection.

The instructions may further include adjusting the operation of the noise emitting devices by selecting an operating mode for a noise emitting device at which the actual noise profile matches the desired noise profile for a selected frequency, and commanding the noise emitting device to operate at the selected operating mode. The selected frequency may be determined based on one or more of: a direct user indication, an inferred user indication, a time of day, and/or an ambient noise level in the predefined area.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

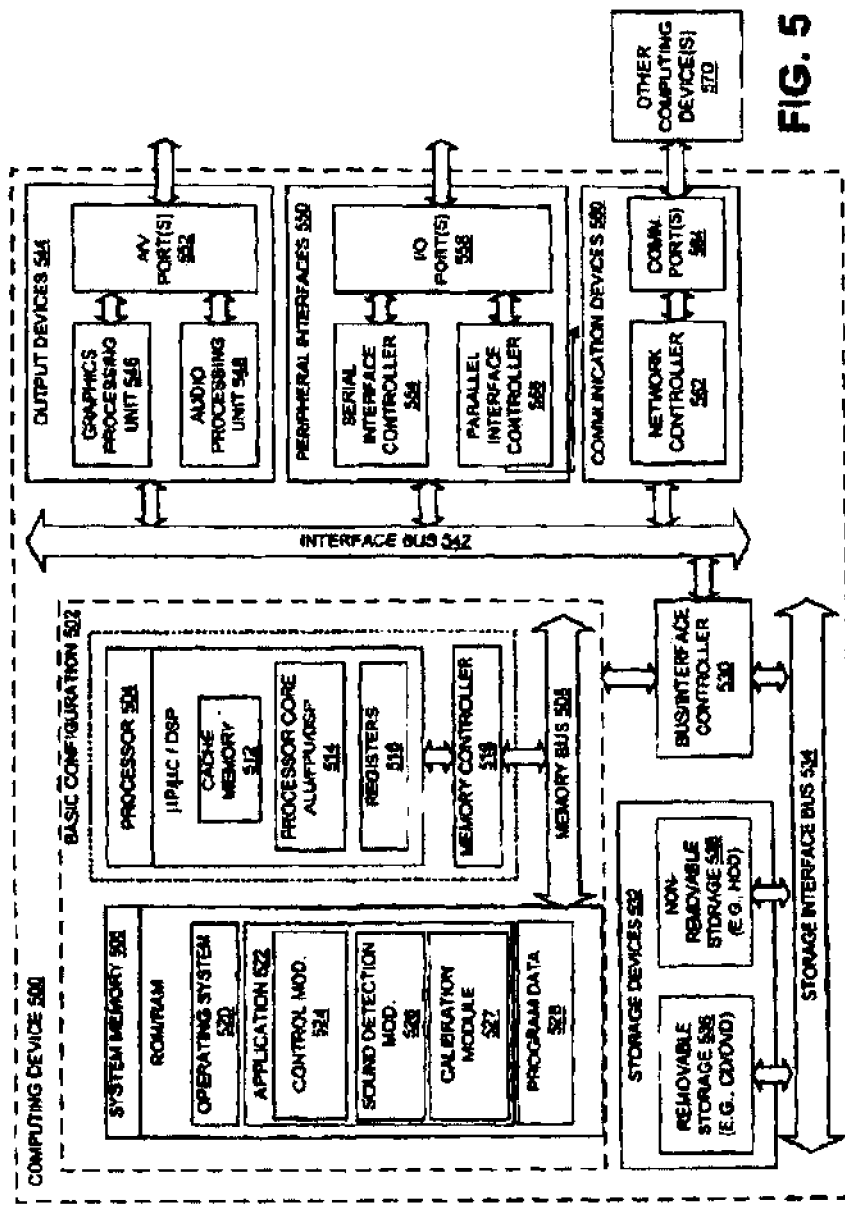

What is claimed is:

1. A method to manage noise levels by control of operation of noise emitting devices, the method comprising:
    identifying a desired noise profile of a first area, wherein the first area is proximate to the noise emitting devices;
    monitoring noise characteristics within the first area to determine if the monitored noise characteristics exceed a limit defined by the identified noise profile;
    in response to a determination that one or more of the monitored noise characteristics exceed the limit:
        retrieving device noise profiles associated with each operating mode of the noise emitting devices;
        estimating noise characteristics of the first area for each operating mode of each of the noise emitting devices using the retrieved device noise profiles;
    adjusting an operation of at least one of the noise emitting devices to achieve the identified noise profile of the first area based on the estimated noise characteristics of the first area; and
    in response to a detection of a closed door between the first area and an adjacent second area:
        determining a new noise profile through a measurement of an acoustic transfer function within the first area; and
        adjusting the operation of the at least one of the noise emitting devices to achieve the new noise profile.

2. The method according to claim 1, further comprising:
    initiating sound emission from the noise emitting devices located in the first area;
    capturing noise measurements associated with the sound emission from the noise emitting devices located in the first area; and
    evaluating the obtained noise measurements to determine the acoustic transfer function associated with the first area.

3. The method according to claim 2, further comprising:
    adjusting the operation of the at least one of the noise emitting devices based on one or more of: the acoustic transfer function and/or the monitored noise characteristics.

4. The method according to claim 2, wherein initiating the sound emission from the noise emitting devices comprises activating the noise emitting devices to emit one or more of a special tone, an operational tone, and/or operational noise emitted by operating in a standard operating mode associated with the noise emitting devices.

5. The method according to claim 1, further comprising:
    identifying alternate operating modes for the noise emitting devices; and
    switching the at least one of the noise emitting device to an identified alternate operating mode such that the identified noise profile is achieved at a selected frequency.

6. The method according to claim 1, wherein the noise characteristics include one or more of a single frequency, a spectrum of frequencies, a periodicity, and/or a level of noise at one of a selected frequency or a range of frequencies.

7. The method according to claim 1, wherein the noise emitting devices are located either within the first area or outside of the first area.

8. The method according to claim 1, further comprising capturing the noise characteristics within the first area through one or more microphones, wherein each of the microphones are either standalone or affixed to the noise emitting devices.

9. The method according to claim 1, further comprising determining the desired noise profile within the first area based on one or more of: user preferences, time of day, day of week, energy usage, and/or ambient noise levels identified within the first area.

10. The method according to claim 1, wherein adjusting the operation of the noise emitting devices comprises one or more of:
    modifying time of operation of the noise emitting devices;
    modifying a duration of operation of the noise emitting devices;
    coordinating an operation of two or more of the noise emitting devices;
    modifying an operational mode of the noise emitting devices; and/or
    modifying an energy consumption of the noise emitting devices.

11. The method according to claim 1, wherein the operation of the noise emitting devices is adjusted based on one or more of: a rule, a time of day, an operation of another device, an ambient noise level associated with the first area, a user indication, and/or an overall energy consumption of the noise emitting devices.

12. The method according to claim 1, further comprising integrating the adjustment of the operation of the noise emitting devices to a security application.

13. The method according to claim 1, wherein adjusting the operation of the noise emitting devices includes communicating with the noise emitting devices through one or more of a power line, a wired connection and/or a wireless connection.

14. The method according to claim 1, further comprising receiving an absence indication from a user and suspending adjustment of the operation of the at least one of the noise emitting devices during an absence of the user.

15. The method of claim 1, further comprising:
retrieving the device noise profiles from a database.

16. A system to manage noise levels by control of operation of electrical devices that emit noise, the system comprising:
a communication module adapted to communicate with the electrical devices for adjustment of an operation of the electrical devices; and
a controller configured to:
select a desired noise profile associated with an area, wherein the area is proximate to the electrical devices;
monitor noise characteristics of the area through the at least one sound detection device to determine if the monitored noise characteristics exceed a limit defined by the selected noise profile;
in response to a determination that the monitored noise characteristics exceed the limit:
retrieve device noise profiles associated with each operating mode of the electrical devices;
estimate noise characteristics of the area for each operating mode of each of the electrical devices using the retrieved device noise profiles, wherein the device noise profiles include a list of peak frequencies, sound levels corresponding to each operating mode, and a total sound pressure level for each operating mode;
adjust the operation of at least one of the electrical devices until the selected noise profile is achieved within the area based on the estimated noise characteristics of the area; and
instruct the at least one of the electrical devices to turn off in response to a determination that the selected noise profile does not match the retrieved device noise profile associated with the operating mode of the at least one of the electrical devices.

17. The system according to claim 16, wherein the desired noise profile is selected as one of: total ambient noise in the area, a noise component at one or more selected frequencies, or a noise component from one or more selected electrical devices.

18. The system according to claim 16, wherein the controller is further configured to:
command the at least one electrical device to cycle through operating modes;
identify the device noise profile associated with the operating mode of the at least one electrical device by detection of noise characteristics at different operating modes and frequencies; and
select the operating mode for the at least one electrical device based on a comparison of the identified device noise profile and the selected noise profile for the area.

19. The system according to claim 18, wherein the controller is further configured to:
identify a combined device noise profile for two or more of the electrical devices that operate simultaneously; and
select operating modes for the two or more of the electrical devices based on a comparison of the combined device noise profile of the two or more of the electrical devices and the selected noise profile for the area.

20. The system according to claim 16, wherein the controller is a separate device adapted to manage an operation of the electrical devices centrally through one or more of: a wired communication and/or a wireless communication through the communication module.

21. The system according to claim 16, wherein the controller comprises one of: a separate module and an integrated module on each of the electrical devices adapted to manage an operation of the electrical devices in a distributed manner.

22. The system according to claim 16, wherein the controller is further configured to modify one or more of: an operation time, an operation duration, an operation mode, and/or an energy consumption of the electrical devices based on one or more of: a rule, a time of day, an operation of another device, an ambient noise level associated with the area, a user indication, and/or an overall energy consumption of the electrical devices.

23. The system according to claim 16, wherein the electrical devices include household appliances.

24. The system according to claim 16, wherein the controller is configured to select the desired noise profile based on one or more of: a direct user indication, an inferred user indication, a time of day, and an ambient noise level associated with the area.

25. The system according to claim 24, wherein the inferred user indication includes user activation and/or user selected operation mode of at least one of the electrical devices.

26. The system according to claim 16, wherein the controller is further configured to monitor a plurality of areas and adjust the operation of the electrical devices to achieve the selected noise profile in the plurality of areas.

27. The system according to claim 16, wherein the controller is configured to retrieve the device noise profiles from a database.

28. A non-transitory computer-readable storage medium that includes instructions stored thereon to manage noise profiles by control of operation of noise emitting devices, the instructions comprising:
selecting a desired noise profile associated with a first area;
monitoring noise characteristics within the first area through at least one sound detection device to determine if the noise characteristics exceed a limit defined by the selected noise profile, wherein the first area is proximate to the noise emitting devices;
in response to a determination that the monitored noise characteristics exceed the limit:
retrieving device noise profiles associated with each operating mode of the noise emitting devices;
estimating the noise characteristics of the first area for each operating mode of each of the noise emitting devices using the retrieved device noise profiles;
adjusting an operation of at least one of the noise emitting devices by communicating with the noise emitting devices to achieve the selected noise profile of the first area based on the noise characteristics of the first area, through one or more of a power line, a wired connection and/or a wireless connection;
instructing the at least one of the noise emitting devices to turn off if the retrieved device noise profile associated with the operating mode of the at least one of the noise emitting device does not match the selected noise profile; and in response to another detection of a closed door between the first area and an adjacent second area:
- determining a new noise profile through a measurement of an acoustic transfer function within the first area; and
- adjusting the operation of the at least one of the noise emitting devices to achieve the new noise profile.

29. The non-transitory computer-readable storage medium according to claim 28, wherein the instructions further comprise adjusting the operation of the at least one of the noise emitting devices by:
- selecting an operating mode for each of the noise emitting devices at which the selected noise profile is achieved for at least one selected frequency,
- commanding each of the noise emitting devices to operate at the selected operating mode.

30. The non-transitory computer-readable storage medium according to claim 29, wherein the at least one selected frequency is determined based on one or more of: a direct user indication, an inferred user indication, a time of day, and/or an ambient noise level in the first area.

* * * * *

UNITED STATES PATENT AND TRADEMARK OFFICE
CERTIFICATE OF CORRECTION

Page 1 of 3

PATENT NO. : 8,862,273 B2
APPLICATION NO. : 13/056026
DATED : October 14, 2014
INVENTOR(S) : Karr It is certified that error appears in the above-identified patent and that said Letters Patent is hereby corrected as shown below:

In the Drawings

In Fig. 5, Sheet 5 of 8, delete "UP/UC/DSP" and insert -- µP/µC/DSP --, therefor. See attached Drawing sheet.

In Fig. 8, Sheet 8 of 8, for Tag "804", in Line 8, delete "DESIRES" and insert -- DESIRED --, therefor. See attached Drawing sheet.

In the Specification

In Column 2, Line 52, delete "FIG. 5 an" and insert -- FIG. 5 is an --, therefor.

In Column 4, Line 14, delete "and or" and insert -- and/or --, therefor.

In Column 8, Line 61, delete "processor 310" and insert -- processor 410 --, therefor.

In Column 8, Lines 65-66, delete "processor 414" and insert -- processor 410 --, therefor.

In Column 11, Lines 1-2, delete "communication device 546 includes a network controller 532," and insert -- communication device 560 includes a network controller 562, --, therefor.

In Column 11, Line 4, delete "devices 560" and insert -- devices 570 --, therefor.

In Column 13, Line 2, delete "NOSE" and insert -- NOISE --, therefor.

In Column 17, Line 28, delete "and or" and insert -- and/or --, therefor.

In Column 19, Line 25, delete "thereof" and insert -- thereof. --, therefor.

Signed and Sealed this
Twenty-third Day of June, 2015

Michelle K. Lee
*Director of the United States Patent and Trademark Office*